E. M. BALL.
Fire-Escapes.
No. 207,705.                                   Patented Sept. 3, 1878.
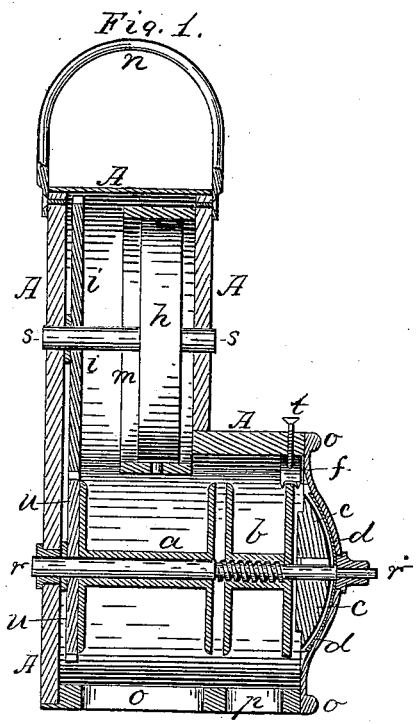
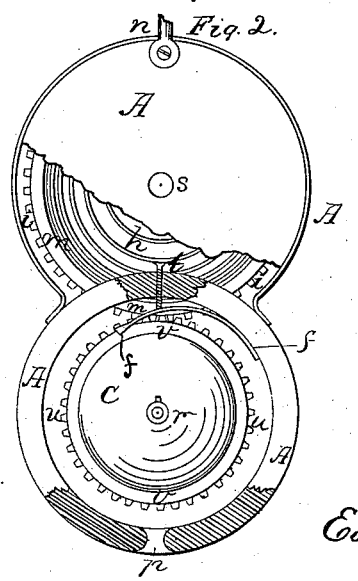
WITNESSES:
S. P. Heath.
C. K. McClintock.
INVENTOR:
Edward Moses Ball,
per
Kiswell & Gilman,
Attorneys.

UNITED STATES PATENT OFFICE.

EDWARD M. BALL, OF STANSTEAD, QUEBEC, CANADA, ASSIGNOR OF ONE-HALF HIS RIGHT TO DANIEL FRANCIS GALLAHER AND WILLIAM O. NEIL, OF SAME PLACE.

IMPROVEMENT IN FIRE-ESCAPES.

Specification forming part of Letters Patent No. 207,705, dated September 3, 1878; application filed July 20, 1878.

*To all whom it may concern:*

Be it known that I, EDWARD MOSES BALL, of Stanstead, Province of Quebec, in the Dominion of Canada, have invented a new and useful Improvement in Fire-Escapes, of which the following is a specification:

My invention relates to fire-escapes; and consists, first, of a threaded spool, in combination with a sliding disk and mechanism for operating them upon their shaft, and a frictional bearing-surface; secondly, of a threaded spool having a flange, in combination with a spring, disk, and frictional bearing-surface; thirdly, of two spools, a lenticular sliding disk, and mechanism for operating them upon their shaft, and a frictional bearing-surface; and, lastly, of the combination of the operative parts of my device, as hereinafter described and claimed.

In the accompanying drawing, in which similar letters indicate like parts, Figure 1 is a vertical transverse section of Fig. 2, which is an elevation of the same, showing that part which is at the right in Fig. 1, parts being removed and parts being broken away to more fully show the mechanism.

Upon the shaft $r$ is mounted a spur-gear wheel, $u$, spool $a$, threaded spool $b$, and lenticular disk $c$. Said gear-wheel $u$ and spool $a$ are firmly secured to said shaft $r$. Spool $a$ can be filled with wire rope of a size sufficient to sustain with safety a person's weight. Spool $b$ is also to be filled with smaller wire, both spools being wound in the same direction. The nut of spool $b$ is threaded to screw on the shaft $r$, as clearly shown in Fig. 1. The lenticular-shaped disk $c$ is so keyed to shaft $r$ that it must revolve with the shaft, yet can slide freely in a longitudinal direction on the said shaft. A disk of felt, $d$, charged with anything that will assist in retarding or arresting the motion of the disk $c$ when pressed, lies between the convex face of disk $c$ and concave face of the cap $o$ of the case A.

A spring, $f$, presses on the periphery of the flange $v$ of the spool $b$, the amount of pressure being adjusted by means of the screw $t$. Openings $o$ and $p$ in the lower part of the case A are provided, through which the ropes run as they are wound or unwound from spools $a$ and $b$.

The gear-wheel $u$ engages with a larger gear-wheel, $i$, mounted on and secured to the shaft $s$. A coiled spring, $h$, is hooked to this shaft, and also to the spring-case $m$, which is secured to the case A. To the upper part of the case A is secured the bale $n$, by which the device is hung in the place desired by means of hooks or otherwise.

The device being secured to a window, a person attached to the rope on the spool $a$ will not descend until the rope on the spool $b$ is pulled, which acts to unscrew or withdraw said spool $b$ from the disk $c$, when the two spools $a$ and $b$ will revolve together, permitting the operator to descend. On letting go of the smaller rope the friction-spring $f$ will tend to arrest the motion of spool $b$, thus screwing it against the disk $c$, which serves as a friction-clutch.

The act of descending also winds up the spiral spring $h$, so that when the person descending is detached from the rope it will be returned automatically, ready to serve for a second person, and so on.

What I claim is—

1. The threaded spool $b$, in combination with the sliding disk $c$, and mechanism for operating them upon their shaft, and frictional bearing-surface $d$, substantially as described.

2. The threaded spool $b$, having flange $v$, in combination with the spring $f$, lenticular disk $c$, and frictional bearing-surface $d$, substantially as described.

3. The spool $a$, in combination with the threaded spool $b$, lenticular sliding disk $c$, and mechanism for operating them upon their shaft, and frictional bearing-surface $d$, substantially as shown and described.

4. The combination of the spring $h$, gearing $i\ u$, pulleys $a\ b$, lenticular sliding disk $c$, frictional bearing-surface $d$, and spring $f$, substantially as shown and described.

In testimony that I claim the foregoing as my own I affix my signature in presence of two witnesses.

EDWARD MOSES BALL.

Witnesses:
 F. A. WISWELL,
 W. H. GILMAN.